UNITED STATES PATENT OFFICE.

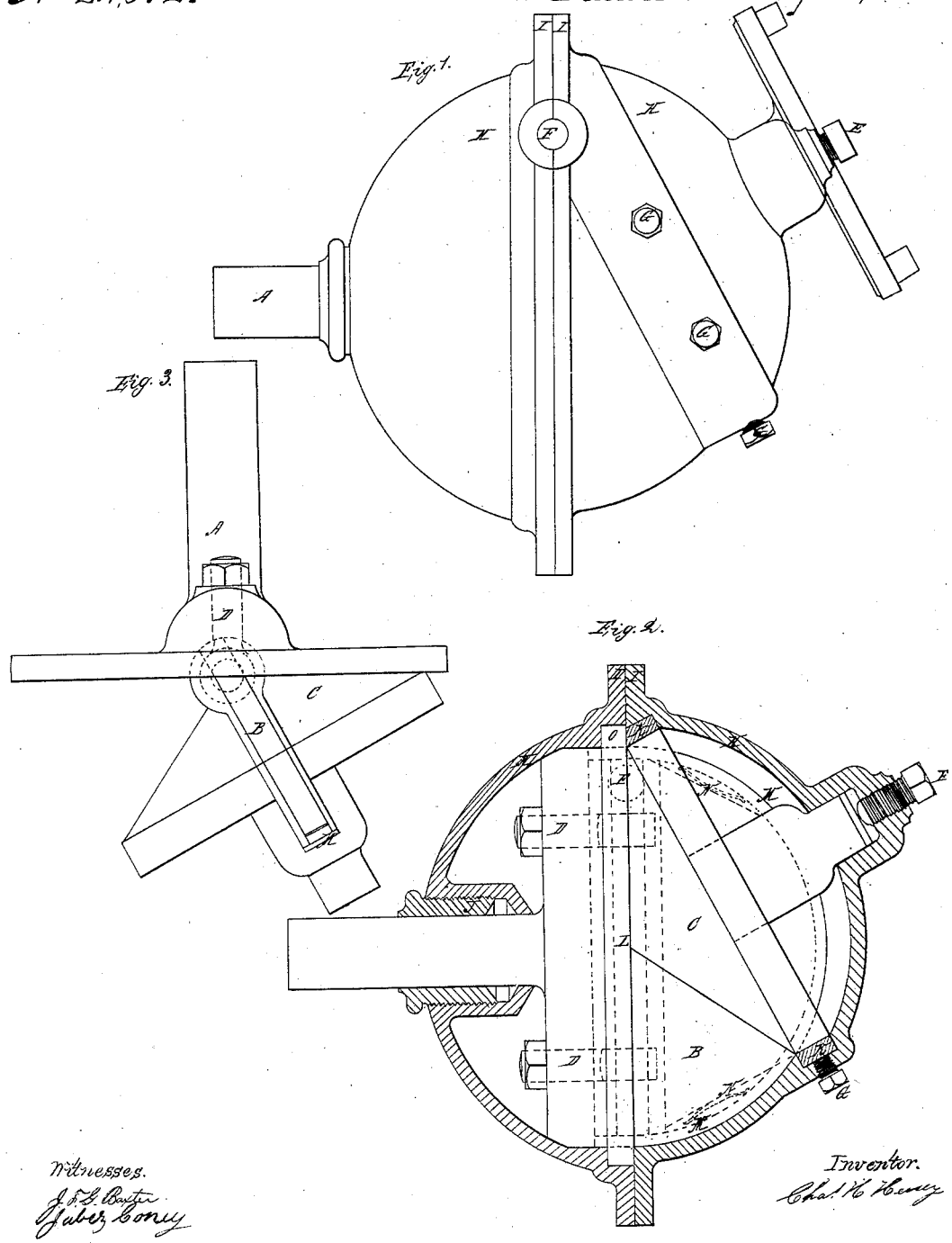

CHARLES H. HERSEY, OF BOSTON, MASSACHUSETTS.

ROTARY PUMP.

Specification of Letters Patent No. 24,872, dated July 26, 1859.

*To all whom it may concern:*

Be it known that I, CHAS. H. HERSEY, of Boston, in the county of Suffolk and State of Massachusetts, have invented a new and useful Improvement in Rotary Steam-Engines; and I do declare that the following is a clear, full, and exact description of the construction and operation of the same, reference being had to the annexed drawings, making a part of this specification, in which—

Figure 1 is a perspective view; Fig. 2 a vertical section; Fig. 3 a view of the working parts removed from the outside shells.

To enable others skilled in the art to make and use my invention, I will proceed to describe its construction and operation.

The case which contains the working parts consists of two semi-spherical shells H, H, Figs. 1 and 2, which are bolted together by the flanges I, I. Into one half the said sphere is fitted the cone C, with one plane of the cone exactly coinciding with the flange on the end of the shaft A, said flanged shaft being fitted to the other half of said sphere with the end projecting through the sphere so as to attach a pulley or other means of communicating power; and is made steam tight by means of the stuffing box J. The flanged end of the shaft A, is grooved across its center to receive the hinge valve B, said hinge valve being a portion of a circle with the straight edge rounded so as to exactly fit the groove in the flange, and is held in its place firmly by the eye bolts D, D, the edge of the hinge valve being cut away around the eyebolts, so as to allow of the said valves, moving or swinging in the groove sufficiently to accommodate itself to the different positions it must take in making a revolution in connection with the cone C, through which cone it passes as shown in Fig. 3. The cone C, is made to fit steam tight within the shell. The cone is pressed down upon the flange of the shaft A, by means of the set screw E thereby keeping it firmly in contact with the flange. The half of the sphere which contains the cone C, is bored out on the same circle with the hinge valve, and the hinge valve is made to fit steam tight in said sphere (so that no steam may pass by it). The orifice for the admission of steam is placed in the outside shell as near the point where the cone and flange come in contact as it can be put and get sufficient area for the steam to enter as shown at F, Figs. 1 and 2. The orifice for the escape of the steam is placed in the outside shell upon the opposite side of the point of contact of cone and flange to that on which the steam enters, the precise position of which may be determined by placing one part of the hinge valve just beyond the induction orifice, and making the eduction orifice just beyond the other end of said hinge valve, so that space inclosed in the sphere on one side of the hinge valve may be open to let the steam escape, while the space inclosed upon the other side of the blade will be open to the admission of steam.

The operation is as follows: Steam being admitted through the orifice F, presses upon the one side of the hinge valve B and is prevented from passing to the eduction port by means of the cone pressing against the flange of the shaft A. Consequently the pressure upon the one side of the hinge valve causes it to turn carrying with it the flange shaft, and the cone. As it revolves the angle at which the cone and shaft are to each other causes the blade to be drawn out of the cone on the one side and pressed in upon the other, that is to say the surface of cone, and face of flange on the shaft, being in contact on the line L, O, and gradually receding from each other to a point directly opposite O, where they are at the greatest distance from each other. Now the portions of cone and flange which are in contact from L to O, will upon making a half revolution be at their greatest distance from each other, and as the hinge valve is attached to the flange it must be gradually drawn out from the cone as the portion of flange to which it is attached recedes from the cone in making a half revolution; for the remaining half revolution it is as gradually depressed into the cone by the portion of flange to which it is attached again approaching the face of cone until it reaches the point of starting where the flange will again come in contact with the cone on the line L, O. After the half revolution is made, the other side of the hinge valve will have arrived at the orifice for the admission of steam and the former side to the orifice for the escape of the steam, each side of the blade and the space inclosed being alternately in communication with the steam and exhaust orifices.

I am aware that S. D. Carpenter received Letters Patent dated Oct. 10th 1854 for a rotary pump which contained a cone and propeller blade the movement of the blade was caused by rubbing around against the face of an oblique cap or cover, which constant friction soon wears away the blade and causes leak, also the cone being in contact and revolving against the cap at one place wears away the cap at that point, also the cone being the part which drives the blade, great friction is produced upon the slot through the cone where the blade passes through it, as the water presses against the blade and presses the valve against the slot, in cone, wearing it away and causing much friction. In my arrangement the cone moves around with the flange shaft and the sides of cone roll upon the flange, also there is but little friction produced by the passage of the hinge valve through the cone as the power is not transmitted through the cone, its only office being to revolve with the shaft and form the steam and exhaust chambers. I do not claim anything patented by the said Carpenter in his patent for a rotary pump dated Oct. 10th 1854, but What I do claim as my invention and desire to have secured to me by Letters Patent is—

The combination of the flanged shaft with the hinged valve and cone substantially as described, for the purpose specified.

CHARLES H. HERSEY.

Witnesses:
 LLOYD BRIGGS,
 H. H. WHITE.